United States Patent
Kumar et al.

(10) Patent No.: US 11,468,674 B2
(45) Date of Patent: Oct. 11, 2022

(54) SYSTEMS AND METHODS FOR DYNAMIC IMAGE CATEGORY DETERMINATION

(71) Applicant: Adobe Inc., San Jose, CA (US)

(72) Inventors: Jayant Kumar, San Jose, CA (US); Vera Lychagina, San Jose, CA (US); Tarun Vashisth, New Delhi (IN); Sudhakar Pandey, Sunnyvale, CA (US); Sharad Mangalick, San Francisco, CA (US); Rohith Mohan Dodle, Fremont, CA (US); Peter Baust, Sunnyvale, CA (US); Mina Doroudi, San Jose, CA (US); Kerem Turgutlu, San Jose, CA (US); Kannan Iyer, San Jose, CA (US); Gaurav Kukal, Fremont, CA (US); Archit Kalra, Fremont, CA (US); Amine Ben Khalifa, San Jose, CA (US)

(73) Assignee: Adobe Inc., San Jose, CA (US)

( * ) Notice: Subject to any disclaimer, the term of this patent is extended or adjusted under 35 U.S.C. 154(b) by 171 days.

(21) Appl. No.: 16/995,869

(22) Filed: Aug. 18, 2020

(65) Prior Publication Data
US 2022/0058391 A1    Feb. 24, 2022

(51) Int. Cl.
*G06V 20/00*    (2022.01)
*G06K 9/62*    (2022.01)
*G06F 16/53*    (2019.01)
*G06N 3/08*    (2006.01)

(52) U.S. Cl.
CPC .............. *G06V 20/35* (2022.01); *G06F 16/53* (2019.01); *G06K 9/6218* (2013.01); *G06K 9/6256* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 2019/0156122 A1* | 5/2019 | Lu | G06K 9/6215 |
| 2019/0220694 A1* | 7/2019 | Biswas | G06V 10/751 |
| 2020/0394441 A1* | 12/2020 | Wen | G06K 9/6271 |

* cited by examiner

*Primary Examiner* — Leon Flores
(74) *Attorney, Agent, or Firm* — FIG. 1 Patents

(57) ABSTRACT

Disclosed are systems and methods for dynamically determining categories for images. A computer-implemented method includes training a neural network to receive an input image and determine one or more image categories associated with the input image; obtaining a set of images associated with a user; and determining, using the trained neural network, one or more image categories associated with each image included in the obtained set of images.

20 Claims, 13 Drawing Sheets

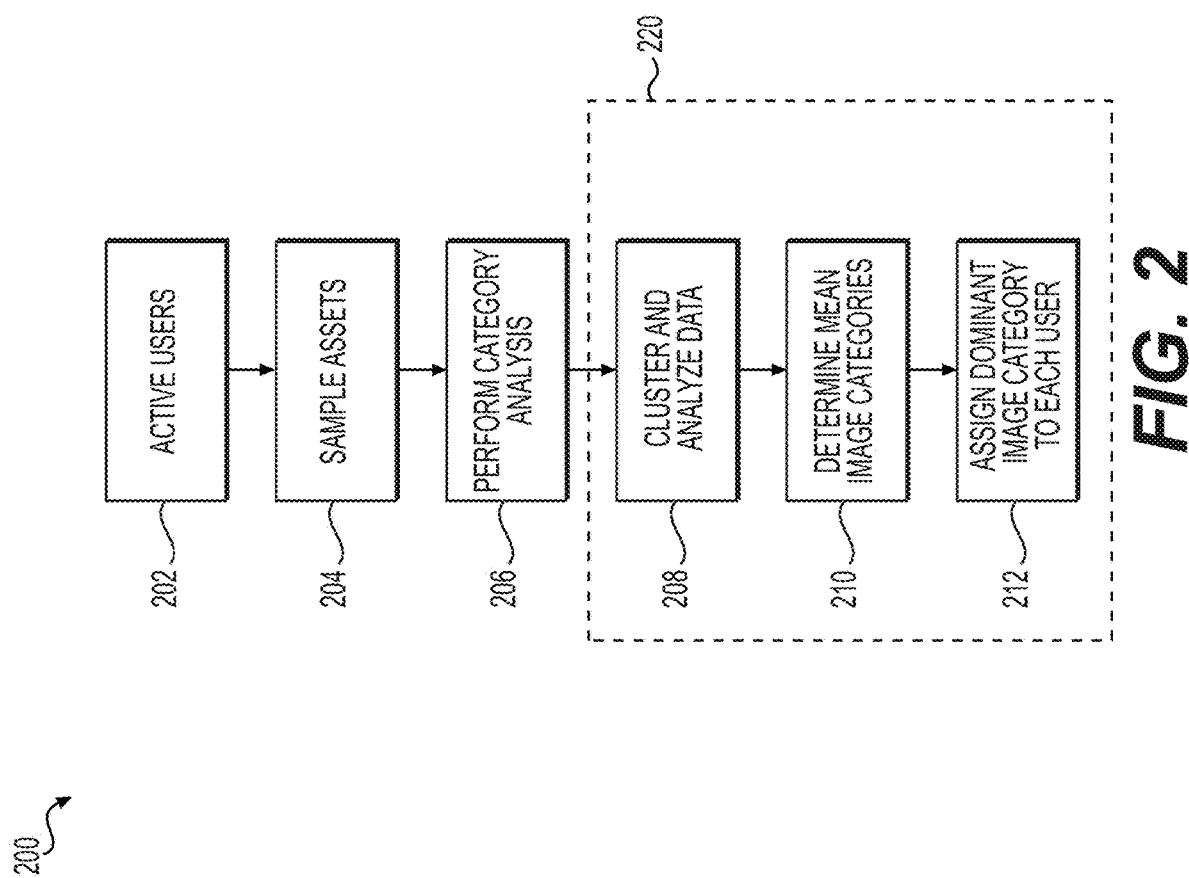

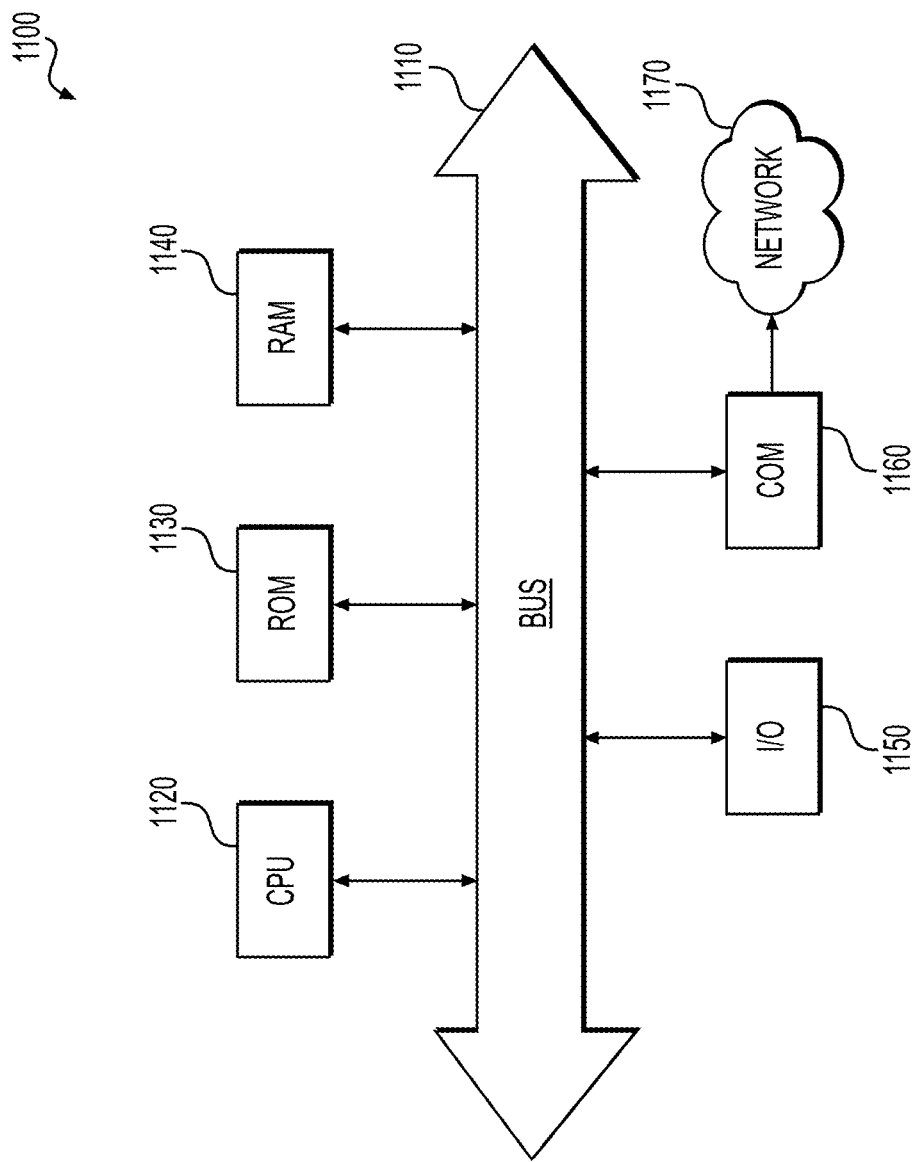

SYSTEMS AND METHODS FOR DYNAMIC IMAGE CATEGORY DETERMINATION

TECHNICAL FIELD

The present disclosure relates to systems and methods for dynamically determining categories for assets, and more particularly, to systems and methods for dynamically determining categories for images.

BACKGROUND

A photographer typically works with photographs related to one or more preferred subject matter categories (i.e., genres), which includes landscapes, portraits, architecture, events, food, animals, fashion, cities, travel, macro, and so on. When working with an image of a particular genre, the photographer utilizes image editing tools, photography tools, and/or gears specific to that genre.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

Systems and methods are disclosed for dynamically determining one or more preferred subject matter categories of a user, based on classifying and analyzing various images associated with the user. Such systems and methods provide a personalized experience for the user utilizing image related tools based on his or her preferred subject matter categories according to some embodiments.

Some embodiments are directed to dynamically determining one or more categories associated with images (i.e., hereinafter referred to as "image categories" or "categories") such as, e.g., photographs, images extracted from video frames, etc. For example, one or more convolutional neural networks is trained to determine categories associated with an image. Such image categories comprise hierarchical categories including at least one high level category and one or more subcategories that branch out from the high level category.

Additional objects and advantages of the disclosed embodiments will be set forth in part in the description that follows, and in part will be apparent from the description, or will be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 depicts an exemplary method of dynamically determining categories associated with one or more users, according to some embodiments.

FIG. 11 provides a simplified functional block diagram of a computer configured to function according to exemplary embodiments of the present disclosure.

DETAILED DESCRIPTION OF EMBODIMENTS

Figure 1:
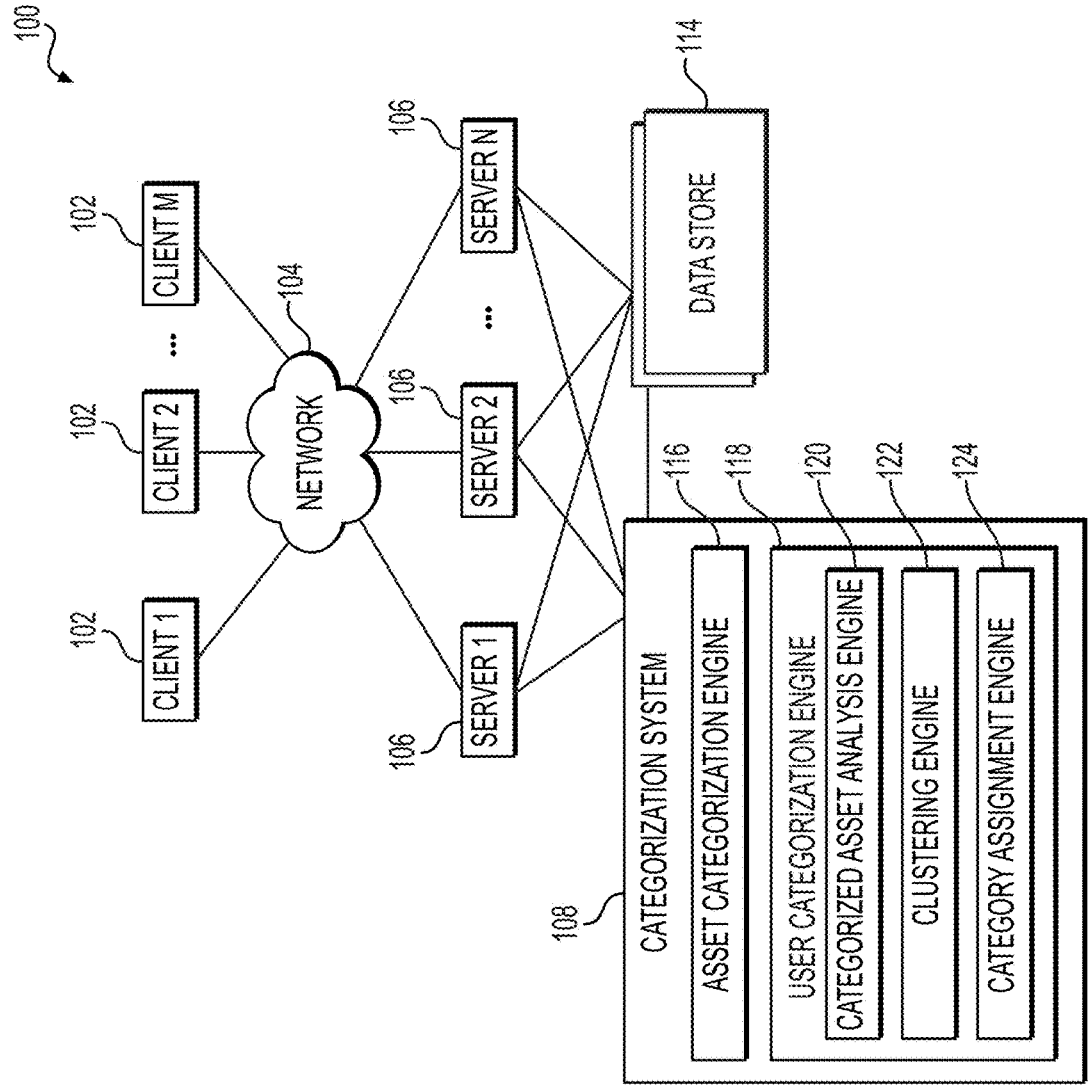
FIG. 1 depicts a schematic diagram illustrating an example of a computer network and environment within which the computer systems and methods disclosed herein are implemented, according to some embodiments of the present disclosure.

The following embodiments describe systems and methods for dynamically determining categories for assets and, more particularly, for dynamically determining categories for images.

With the proliferation of portable devices with image capturing capabilities, there has been a large increase in the number of image processing or editing applications in the market, each with their distinct tools and user interfaces. One feature that is extremely useful in modern image processing/editing applications is to classify images into different categories without or with minimal user intervention. While there are different techniques for classifying images into categories, there is a constant need for classifying images more expeditiously and/or accurately. Further, a mechanism that can translate categorized images into meaningful insight about a particular user and/or a general population helps provide a better image processing/editing experience to consumers. For example, identification of one or more genres or subject matter preferred by a user helps provide better tools and products that can be used during the user's image capturing, processing, and/or editing experience. While conventional methods and systems use machine learning to identify objects within a photograph, conventional techniques lack a method of using machine learning to dynamically determine one or more categories of a photograph. For example, conventional methods and systems utilize machine learning to identify objects such as a tree and/or a person in a photograph. Conventional techniques, however, fail to identify the genre and subject matter (collectively referred to as categories) of the photograph. Accordingly, conventional methods and systems are unable to utilize such dynamically determined categories to determine an affinity of a user towards one or more particular categories.

The techniques disclosed in the present disclosure address one or more of the above challenges. Some embodiments are directed to dynamically determining one or more categories associated with images (i.e., hereinafter referred to as "image categories" or "categories"), such as, e.g., photographs, images extracted from video frames, etc. For example, a convolutional neural network is trained to classify an image into one or more image related categories. As will be described in further detail below, the convolutional neural network is implemented as a hierarchical classification problem with binary cross entropy loss. Such techniques for dynamically determining one or more image categories are utilized to determine one or more image categories preferred by the user (hereinafter referred to as "dominant image categories" or "dominant categories"). For example, a data set is determined based on the dynamically categorized images and associated user information and used to determine affinity of each user towards one or more image categories. In some embodiments, the data set includes distributions of category counts for each of the users. In such embodiments, the category counts are normalized across the users and categories. The normalized category counts are then used to cluster the users using an appropriate clustering method and each cluster is assigned one or more categories. An affinity towards one or more image categories of each user is determined based on a nearest cluster to the user. That is, the one or more categories assigned to the nearest cluster to the user is assigned to the user as his or her dominant image categories.

By identifying such dominant image categories associated with the user, an image editing interface is personalized for the user based on the determined one or more dominant image categories according to some embodiments. For example, recommendations for relevant image editing tools, photography gear, related image editing tutorials, and/or related images are generated or determined based on the determined one or more dominant image categories. Furthermore, additional image editing tools and/or tutorials are developed based on the determined dominant image categories for several users. That is, trends are detected based on the determined dominant image categories for users in some embodiments. Accordingly, development of new or enhanced image editing tools and/or tutorials are focused on such trends. For example, if a detected trend indicates that users are working increasingly more with landscape images and moving away from astro images, image editing interfaces are configured to facilitate image editing for the landscape images by activating certain features suitable for adjusting the landscape images and/or deactivating features that are not useful.

As will be described in further detail below, some embodiments disclosed herein are directed to utilizing one or more convolutional neural networks to determine categories associated with an image. Such image categories comprise hierarchical categories including at least one high level category and one or more subcategories that branch out from the high level category. The determined image categories for a user (i.e., the categories determined for images associated with a user) are aggregated to determine whether the user prefers one or more image categories relative to others. That is, one or more dominant image categories are determined for the user based on the distribution of the image categories associated with the user.

The embodiments disclosed herein provide significant advantages over conventional methods and systems. For example, embodiments disclosed herein provide enhanced software application capabilities including, but not limited to: classifying user assets (e.g., photographs and other images that belong to or are otherwise associated with the user) into image categories and aggregating the determined image categories to determine an affinity of the user towards one or more specific image categories; providing high-level categories in addition to existing metadata to enhance image data within image storage and/or image editing tools; and providing image categories comprising hierarchical categories that include at least one high level category and one or more subcategories to the at least one high level category, thereby enabling both a high level and a granular level analysis.

As illustrated by the foregoing discussion, the present disclosure uses a variety of terms to describe features and benefits of the embodiments disclosed herein. Additional detail now provided regarding the meaning of these terms. For example, as used herein, the term "neural network" refers to a trainable computer-based algorithm that analyzes data to make predictions. In some embodiments, a neural network refers to a tunable model that is trained to make predictions based on training data. In particular, a neural network includes a computer-implemented algorithm that analyzes input (e.g., training input) such as a digital image to make predictions and that improves in accuracy by comparing generated predictions against ground truth data and modifying internal parameters for subsequent predictions. In some embodiments, a neural network employs supervised learning, while in other embodiments a neural network employs unsupervised learning or reinforcement learning. In the same or other embodiments, a neural network is a convolutional neural network and/or a deep neural network.

Relatedly, the term "train" refers to utilizing information to tune or teach a neural network. The term "training" (used as an adjective or descriptor, such as "training data" or "training digital image") refers to information or data utilized to tune or teach the model.

Further, as used herein, the term "digital image" refers to a digital symbol, picture, icon, or illustration. For example, a digital image includes a digital file in any one of the following file formats: JPG, TIFF, BMP, PNG, RAW, or PDF.

The term "image categories" refers to the genre or subject matter of a particular digital image. For example, image categories includes landscapes, portraits, architecture, events, food, animals, fashion, cities, travel, macro, and so on.

The term "dominant image categories" refers to image categories that a user shows an affinity towards. For example, a photographer who specializes in landscape images handles more landscape images compared to others. In such instances, the photographer's dominant image categories includes the landscape category. In some embodiments, a user has more than one categories included in his or her dominant image categories.

The term "vector" refers to a representation of a category count distribution of a user. For example, a vector for a user is a normalized indication of the distribution of category counts across a plurality of image categories for the user.

Relatedly, the term "cluster" refers to a cluster of vectors. In some embodiments, a plurality of vectors, each associated with a separate user, are clustered using an appropriate clustering method as will be described in further detail below. Each of the resulting groups of vectors is referred to as clusters.

The term "cluster mean" refers to a mean of each of the aforementioned clusters. In some instances, the cluster mean indicates the mean category counts for each cluster.

Turning now to the figures, FIG. 1 shows a block diagram of an exemplary electronic communications system 100 for implementing embodiments of the present disclosure, or aspects thereof. In some embodiments, the electronic communications system 100 comprises clients 102, servers 106, data store 114, and categorization system 108, all connected with each other via network 104. As shown in FIG. 1, the system 100 includes one or more clients 102 (e.g., Client 1, Client 2, . . . Client M). In some embodiments, the clients 102 are implemented with devices, and/or applications running thereon. By way of example, a client 102 is a computing device consistent with or similar to that depicted in FIG. 11, including a personal computer, laptop, tablet computer, personal digital assistant, mobile telephone, smartphone, pager, and/or other types of electronic processing device. In some embodiments, the clients 102 are configured to communicate with other entities in the system 100 via the network 104. In the context of the current disclosure, a client 102 represents a user using one or more of the aforementioned devices and/or applications. In certain embodiments, the network 104 includes any one or combination of communication networks. For example, the network 104 includes the Internet, and other networks such as a wide area network, intranet, metropolitan area network, local area network, wireless network, cellular communications network, etc., or combination thereof. In some embodiments, the clients 102 are configured to initiate electronic requests regarding images. For example, the electronic requests include uploading (e.g., to data store 114) one or more images, modifying one or more images via an image editing user interface, accessing image editing services provided by the servers 106, etc. The electronic requests are generated by the clients 102 and transmitted through the network 104 to appropriate servers such as, for example, the servers 106 and/or data store 114. In some embodiments, an image comprises any type of digital visual media. In the context of the current disclosure, the term "digital visual media" refers to digital data capable of producing a visual representation. For example, digital visual media includes digital images and digital videos. In the context of the current disclosure, the term "digital image" includes a digital symbol, picture, icon, or illustration. For example, a digital image include a digital file in any one of the following file formats: JPG, TIFF, BMP, PNG, RAW, or PDF.

In some embodiments, the servers 106 include one or more servers (e.g., Server 1, Server 2, . . . Server N) configured to interact with other entities illustrated in FIG. 1 via the network 104, such as the data store 114, categorization system 108, and clients 102. In some embodiments, a server 106 is implemented as a single server, a server system comprising a plurality of servers, or a server farm comprising a load balancing system and a plurality of servers. In certain embodiments, the servers 106 comprise hardware, software, or a combination thereof. In some embodiments, a product and/or service is provided to the clients 102 via the servers 106. For example, the servers 106 hosts web-based and/or downloadable image editing software applications.

As shown in FIG. 1, the categorization system 108 includes asset categorization engine 116 and user categorization engine 118 according to some embodiments. In some embodiments, the categorization system 108 is embodied in one or more combinations of hardware, software, and/or firmware. For example, the categorization system 108 is a part of a software application that is installed on any computing device consistent with or similar to that depicted in FIG. 11 according to some embodiments. The asset categorization engine 116 is configured to determine one or more categories associated with an image. In some embodiments, the asset categorization engine 116 is embodied in one or more combinations of hardware, software, and/or firmware. For example, the asset categorization engine 116 is a part of a software application that is installed on any computing device consistent with or similar to that depicted in FIG. 11 according to some embodiments. In some embodiments, the asset categorization engine 116 retrieves images from the data store 114 and determines the category for each of the retrieved images. The asset categorization engine 116 employs neural network approaches (i.e., deep learning). In some embodiments, a neural network is implemented in software representing the human neural system (e.g., cognitive system). A neural network includes a series of layers comprising "neurons" or "nodes." A neural network comprises an input layer to which data (e.g., an image) is presented, one or more internal layers (i.e., hidden layers), and an output layer. The number of neurons in each layer depends on the complexity of a problem to be solved. Input neurons receives data to be analyzed and then transmits the data to a first internal layer through connections carrying respective weights. The data continues to be transformed as different layers perform different transformations on the inputs. The output layer produces the ultimate result, which is evaluated based on a loss/cost function in order to optimize the network. A neural network contemplated by the present disclosure includes a convolutional neural network, as will be described in further detail below with reference to Table 1.

The user categorization engine 118 is configured to determine one or more dominant categories for a user based on the categories predicted by asset categorization engine 116. In some embodiments, the categorization system 108 is embodied in one or more combinations of hardware, software, and/or firmware. For example, the user categorization engine 118 is a part of a software application that is installed on any computing device consistent with or similar to that depicted in FIG. 11 according to some embodiments. In some embodiments, the user categorization engine 118 is further configured to determine an image editing user interface for the user based on the determined one or more dominant image categories. As shown in FIG. 1, the user categorization engine 118 includes categorized asset analysis engine 120, clustering engine 122, and category assignment engine 124 according to some embodiments. In some embodiments, the categorized asset analysis engine 120, clustering engine 122, and/or category assignment engine are embodied in one or more combinations of hardware, software, and/or firmware. For example, the categorized asset analysis engine 120, clustering engine 122, and/or category assignment engine 124 is a part of a software application that is installed on any computing device consistent with or similar to that depicted in FIG. 11 according to some embodiments. The categorized asset analysis engine 120 determines data sets associated with predicted categories. For example, the categorized asset analysis engine 120 determines a data set indicating one or more users, the set of images associated with each user, and the predicted category for each of the images. Further, the categorized asset analysis engine 120 determines a distribution of predicted category counts for each user. The categorized asset analysis engine 120 then normalizes the determined distribution of predicted category counts for each user for further processing by the clustering engine 122, as will be described in further detail below with reference to FIG. 4.

The clustering engine 122 is configured to cluster the normalized distribution of predicted category counts for each user. As will be described in further detail below with reference to FIG. 4, the clustering engine 122 utilizes any appropriate clustering method, for example, K-means clustering, density-based spatial clustering of applications with noise (DBSCAN), and/or affinity propagation (AP), to cluster the normalized distribution of predicted category counts.

The category assignment engine 124 is configured to assign one or more dominant categories to each user based on the clusters determined by the clustering engine 122. As will be described in further detail below with reference to FIG. 4, the category assignment engine 124 determines cluster means for the determined clusters and assign a category to each cluster mean. In some embodiments, the category assignment engine 124 determines one or more dominant categories for a user by determining and comparing distances between a normalized distribution of predicted category counts for the user and the cluster means. For example, the category assignment engine 124 assigns the category assigned to the cluster mean that is the nearest distance from the normalized distribution of predicted category counts for the user as a dominant category. In some embodiments, the category assignment engine 124 determines an image editing user interface for the user based on the determined one or more dominant image categories. In some embodiments, determining the image editing user interface for the user based on the determined one or more dominant image includes generating one or more image editing tool recommendations for the user based on the determined one or more dominant image categories. In some embodiments, determining the image editing user interface for the user based on the determined one or more dominant image categories includes determining one or more image editing tutorials for the user based on the determined one or more dominant image categories. In some embodiments, the category assignment engine 124 notifies the user of the determined one or more dominant image categories.

FIG. 2 is a flowchart illustrating an exemplary method of dynamically determining categories associated with one or more users, according to one aspect of the present disclosure. In some embodiments, method 200 begins with step 202, in which active users (e.g., clients 102) are determined. A user who has uploaded at least one asset (e.g., an image) to, for example, the data store 114, is considered an active user. In some embodiments, a user who has uploaded at least one asset during a first period of time is considered an active user. For example, a user who has uploaded at least one image in the past two months is considered an active user.

In step 204, assets provided by the active users over a second period of time are sampled. For example, assets (e.g., images) uploaded during the second period of time are retrieved. In some embodiments, the retrieved assets are sorted in any appropriate order, for example, chronological order. A predetermined percentage of the retrieved assets are sampled for further processing. For example, images uploaded by a user in the past year are retrieved. In some instances, the retrieved images are sorted in chronological order. In such instances, every fourth image of the sorted images is sampled, thereby sampling approximately 25 percent of the images uploaded by the user in the past year. It should be noted that the retrieved images are sorted in any appropriate manner in alternative embodiments and that any number or percentage of the retrieved images are sampled. Also, in some embodiments, step 204 is optional and all assets provided by the users (e.g., uploaded by the users) during any period of time are retrieved and further processed in accordance with subsequent steps of method 200 (e.g., steps 206-212), which will be described in further detail below.

Figure 3A:
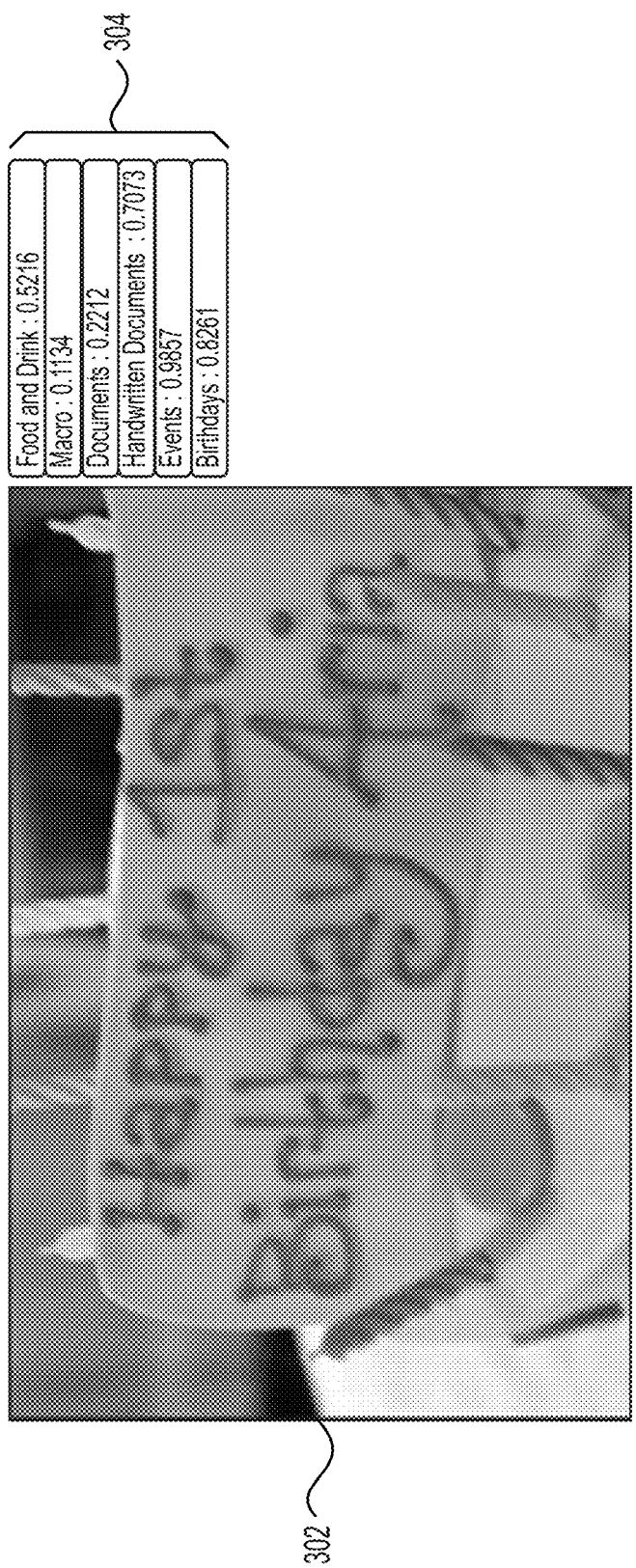
FIG. 3A depicts an image categorized by a neural network, according to some embodiments.

In step 206, a neural network such as, e.g., a convolutional neural network, performs category analysis against the sampled assets. In other words, the neural network predicts one or more categories associated with each of the sampled assets. The neural network is trained to predict one or more categories when an asset (e.g., image) is input to the neural network. In such embodiments, the trained neural network further determines a confidence score for each of the one or more predicted categories for an asset. FIG. 3A depicts an image 302 categorized by the neural network, according to one aspect of the present disclosure. The neural network receives image 302 as input and predicts one or more categories 304 associated with the image 302. The neural network also determines a confidence score for each of the predicted one or more categories 304. For example, the predicted categories 304 for image 302 includes: food and drink, macro, documents, handwritten documents, events, and birthdays. As shown in FIG. 3A, each predicted category have an associated confidence score, for example, 0.5216 for food and drink, 0.1134 for macro, 0.2212 for documents, 0.7073 for handwritten documents, 0.9857 for events, and 0.8261 for birthdays. In some embodiments, the image 302, predicted categories 304, and associated confidence scores are displayed to a user via, for example, an image editing user interface, as shown in FIG. 3A.

In some embodiments, the categories include hierarchical categories including at least one high level category and one or more subcategories to the high level category. For simplicity, high level categories are referred to herein as level 1 categories and subcategories are referred to herein as level 2 categories. Exemplary level 1 categories include: 1) Food and Drink; 2) Nature; 3) Landscapes; 4) Aerial; 5) Astro; 6) Animals; 7) Birds; 8) Fashion; 9) Abstract; 10) Buildings and Architecture; 11) Cities and Streets; 12) Documents; 13) Events; 14) Weddings; 15) Sports; 16) Travel; 17) Macro; 18) Portraits; and 19) Other. Exemplary level 2 categories include subcategories to the level 1 categories. For example, level 2 categories for the level 1 category Landscapes include: Mountains and Meadows; Seascapes; Lightning; Sunsets; and City Landscapes. As another example, level 2 categories for the level 1 category Astro include: Deep Field; and Night Sky Milkyway. As another example, level 2 categories for the level 1 category Documents include: Receipt; Whiteboard; Screenshot; Printed; Handwritten; and Scene Text Signs. As yet another example, level 2 categories for the level 1 category Events include: Birthday; Business Activity; Graduation; Christmas; Halloween; Religious activity; Concerts and Shows; and Other Events. In some embodiments, Level 1 and level 2 categories are determined and updated periodically. It is understood that the number of categories for level 1 and level 2 vary in other embodiments.

Figure 3B:
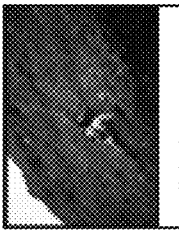
FIG. 3B depicts an exemplary user interface showing categories determined for images associated with a user, according to some embodiments.

FIG. 3B depicts an exemplary user interface showing categories determined for images associated with a user. In some embodiments, the displayed categories include predicted categories based on images uploaded by the user. For example, a neural network is configured to predict the categories associated with the uploaded images. In some embodiments, the user interface 305 is configured to display the predicted categories as being associated with the user, as shown in FIG. 3B. In some embodiments, the displayed categories include level 1 categories, and a representative image is selected and displayed along with each of the predicted level 1 categories. In some embodiments, the representative image is one of the uploaded images that have been categorized under the respective level 1 category. Additionally, the number of uploaded images that fall under each category is displayed along with the representative image. In some embodiments, the displayed categories also include level 2 categories, or a combination of level 1 and level 2 categories. In some embodiments, the neural network is unable to predict one or more categories for an image with a sufficient level of confidence. Such images are categorized and displayed under "low confidence" group 306 as shown in FIG. 3B. In some embodiments, the neural network is unable to categorize an image under predetermined categories, e.g., predetermined level 1 and level 2 categories. That is, categories for a certain image is not yet available. Such images are categorized and displayed under "uncategorized" group 307 as shown in FIG. 3B. In some embodiments, predetermined categories are updated to include additional categories pertinent to such uncategorized images, and/or to remove one or more of the predetermined categories.

In some embodiments, the neural network designed to categorize images include a convolutional neural network such as ResNet34, DenseNet131, ResNet50, or VGG. In some embodiments, the convolutional neural network utilizes a pooling layer in the final layers. For example, ResNet34 or VGG includes a pooling layer utilizing alpha-pooling technique. As explained above, such pooling layer is added in the final layers of the convolutional neural network. In some embodiments, the neural network is implemented using a deep learning library that provides an interface to deep learning applications for vision, text, tabular data, time series, and collaborative filtering. For example, the deep learning library is FastAI in some embodiments. In some embodiments, the neural network is implemented using a deep learning framework such as Caffe or TensorFlow. Table 1 below provides an exemplary list of neural networks used to categorize images, loss and activation functions used in the neural networks, and metrics used to evaluate the performance of the neural networks according to some embodiments.

TABLE 1

| Neural Network | Loss/Activation | Metric |
|---|---|---|
| ResNet34 (FastAI) | Cross-entropy/ Softmax | Average precision Average recall |
| DenseNet131 (FastAI) | Cross-entropy/ Hierarchical Softmax | Precision per class, Recall per class, F-beta |
| ResNet50 + Alpha-pooling (Caffe) | Binary Cross Entropy/ Sigmoid | |
| VGG + Alpha-pooling (Caffe) | | |

As alluded to above, the neural networks configured based on the settings provided in Table 1 are evaluated for performance. For example, each neural network is evaluated based on test data comprising approximately three thousand (3,000) images. An exemplary experiment showed that the neural network comprising ResNet50 with alpha-pooling added in final layers resulted in optimal accuracy for predicting image categories. Exemplary evaluation results for ResNet50 with alpha-pooling based on a plurality of test images are provided below in Table 2.

TABLE 2

| Number of test images | Average precision | Average Recall | Classification Accuracy |
|---|---|---|---|
| 2919 | 0.93 | 0.83 | 88% |

Figure 3C:
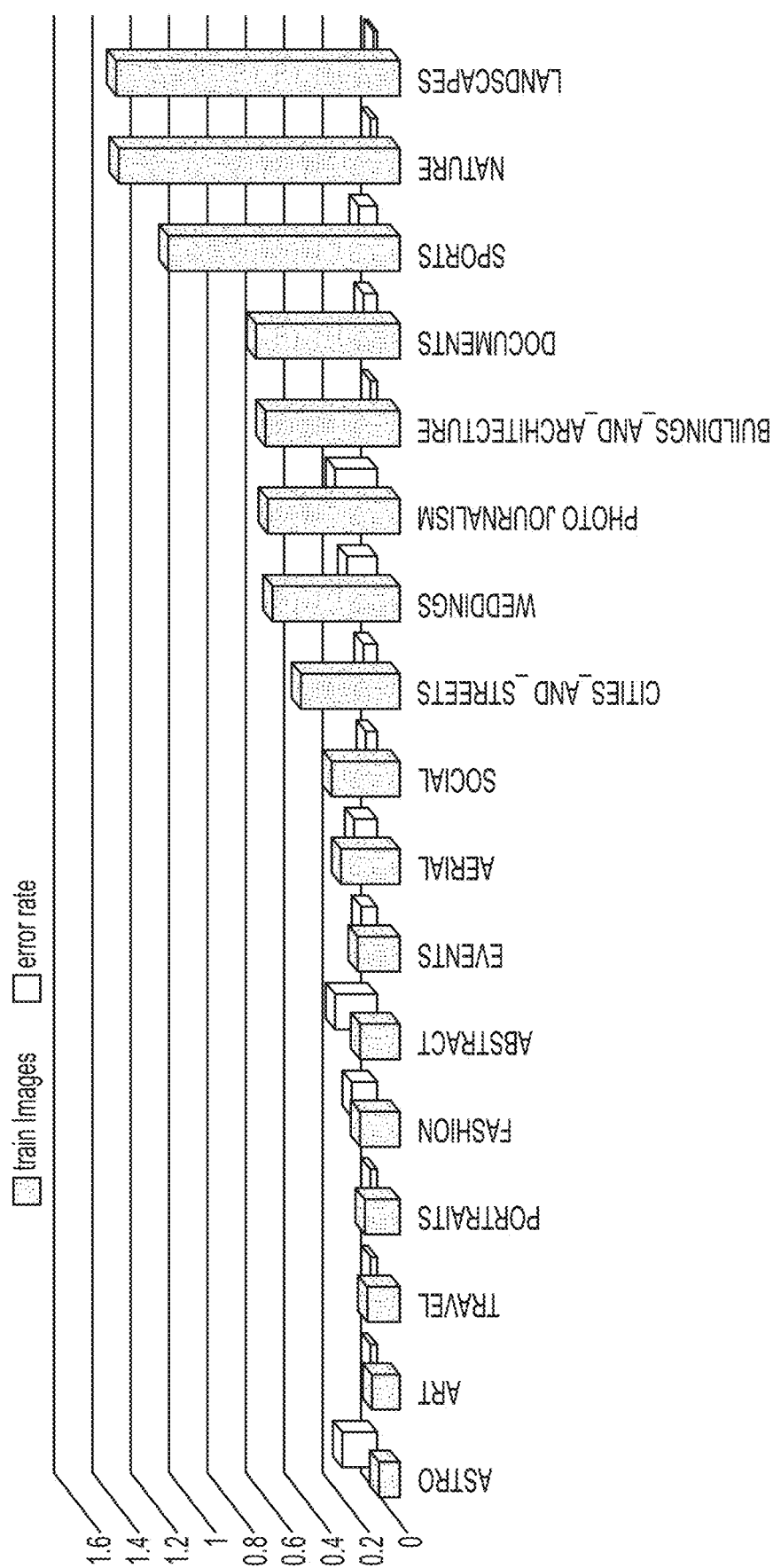
FIG. 3C provides a bar chart illustrating a prediction error rate for each predicted category, relative to a number of samples used to train the neural network, according to some embodiments.

FIG. 3C is a bar chart illustrating a prediction error rate for each predicted category, relative to the number of samples used to train the neural network. The chart shows that the number of training samples have an effect on the prediction error rate. For example, the relatively high number of training images in the Landscapes, Nature, and Sports categories led to lower error rates. The neural network have difficulty learning certain categories, for example, Astro and Abstract, due to the high variation and diversity of images included in such categories.

Referring back to step 206, in addition to performing the category analysis, a data set is generated based on the results of steps 202, 204, and 206, according to some embodiments. Specifically, the data set indicates the determined active users, the set of images associated with each user, and the predicted category for each image. The data set is further processed by clustering and analyzing the data (step 208), determining mean image categories (step 210), and assigning at least one dominant image category to each user (step 212), as will be described in further detail below with reference to FIG. 4. For example, step 208 corresponds to steps 402-410, step 210 corresponds to step 412, and step 212 corresponds to step 414. As shown in FIG. 2, steps 208, 210, and 212 are collectively referred to herein as method 220.

Figure 4:
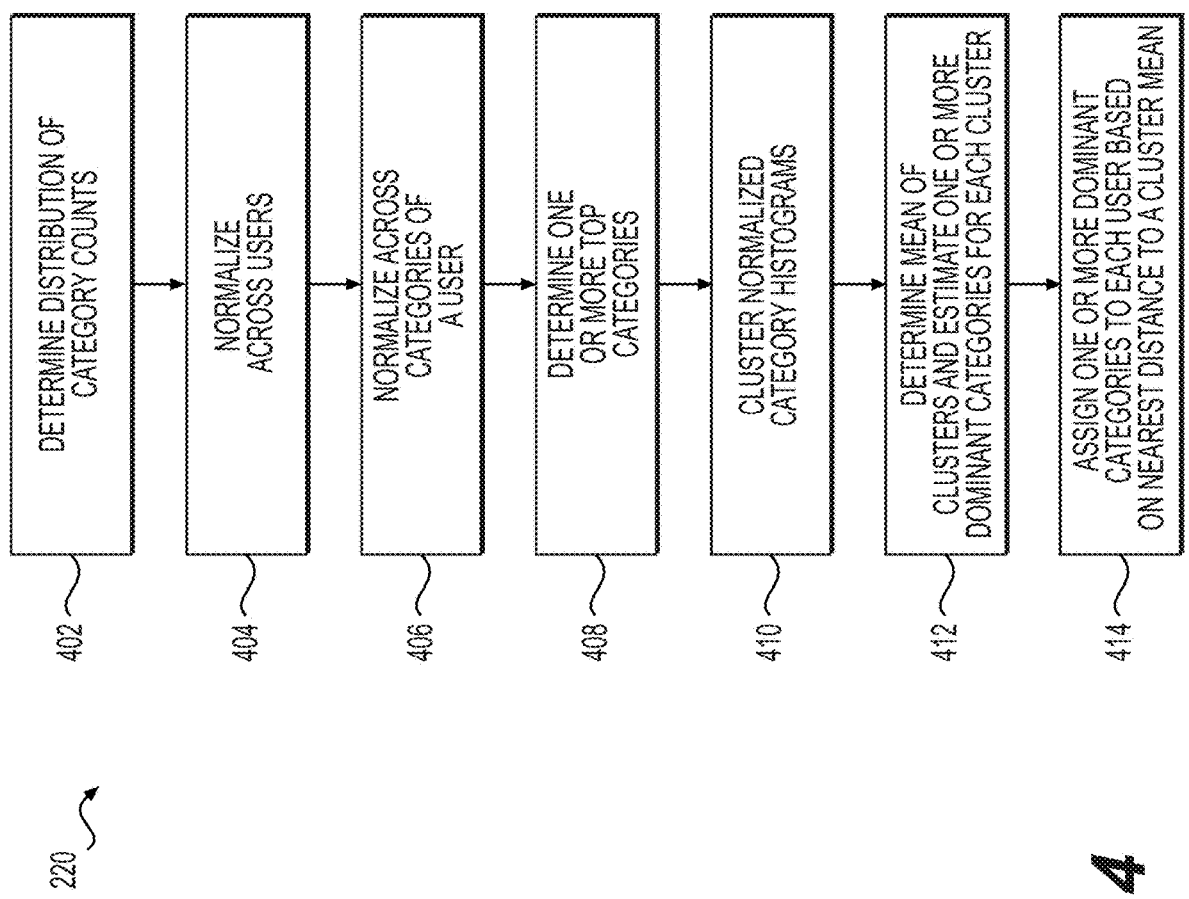
FIG. 4 depicts an exemplary method of assigning dominant image categories to a user based on a clustering technique, according to some embodiments.

FIG. 4 is a flowchart illustrating an exemplary method of assigning dominant image categories to a user utilizing a clustering technique, according to one aspect of the present disclosure. In some embodiments, method 220 begins with step 402 in which a distribution of image counts across the predicted categories for each active user are determined based on the data set (i.e., the data set generated in step 206 of method 200). For the sake of brevity, an image count associated with a category is referred to herein as a "category count." As described above, the data set indicates the determined active users, the set of images associated with each active user, and the predicted category for each image. An exemplary distribution of category counts across the predicted categories for each active user is provided below in Table 3. It should be noted that the distribution of category counts across the categories depicted in Table 3 is for the purpose of explanation only and that the number of categories, users, and images under each category vary in other embodiments.

TABLE 3

| | User | | | | |
|---|---|---|---|---|---|
| Categories | User 1 | User 2 | User 3 | User 4 | User 5 |
| Food and Drink | 118 | 466 | 237 | 292 | 305 |
| Nature | 282 | 949 | 1036 | 10054 | 1215 |
| Landscape | 24 | 1320 | 543 | 21627 | 3070 |
| Aerial | 0 | 32 | 7 | 841 | 246 |
| Astro | 212 | 16 | 8 | 306 | 59 |
| Animal | 2187 | 211 | 233 | 4003 | 1725 |
| Birds | 147 | 56 | 79 | 2299 | 620 |

TABLE 3-continued

| | User | | | | |
|---|---|---|---|---|---|
| Categories | User 1 | User 2 | User 3 | User 4 | User 5 |
| Fashion | 69750 | 7629 | 54757 | 18131 | 861 |
| Abstract | 48 | 111 | 245 | 1386 | 246 |
| Building and Architecture | 132 | 1327 | 157 | 9169 | 1301 |
| Cities | 110 | 1520 | 323 | 2828 | 1481 |
| Events | 18373 | 9765 | 4113 | 9413 | 8643 |
| Weddings | 4854 | 79433 | 6255 | 3096 | 1173 |
| Sports | 5534 | 155 | 2099 | 4081 | 62876 |
| Travel | 159 | 1390 | 1611 | 4339 | 1597 |
| Macro | 65 | 683 | 329 | 998 | 457 |
| Portraits | 34166 | 7646 | 56290 | 15512 | 10749 |

In step 404, the category counts are normalized across the active users. Accordingly, a mean category count pertaining to all active users is determined for each category. Referring to Table 3 above as an example, the category counts across User 1 through User 5 are normalized to obtain a mean number of images for each category. For example, the mean category count for the "Food and Drink" category is approximately 283.6 (i.e., the sum of all category counts determined for the "Food and Drink" category, divided by the number of active users).

In step 406, the category counts across the categories are normalized for each active user. First, for each active user, the category counts determined for all the categories are summed (e.g., 136161 for User 1). Then, a ratio of each category count to the sum is determined for each active user (e.g., approximately 0.51 for the "Fashion" category of User 1). In some embodiments, the ratio is expressed in percentage (%). The normalized values (i.e., the ratios or percentages) are utilized to determine one or more dominant categories for each active user, as will be described in further detail below with reference to step 408.

Based on steps 404 and/or 406, a normalized distribution of category counts (also referred to as "normalized category histograms") per user is determined. In some embodiments, step 406 is optional and the normalized distribution of category counts is obtained based solely on the normalized category counts across all users determined in step 404. In the context of the current disclosure, normalized values indicate values that are converted to a same range for the purpose of clustering. For example, the amount of data points (e.g., category counts) for different users vary. The varying number of data points for each user are converted such that the normalized category counts for each user are in the same range to facilitate clustering, as will be described in further detail below.

In step 408, one or more top categories for each active user are determined based on the normalized distribution of category counts. In the context of the current disclosure, the term "top categories" refer to one or more categories with the highest category counts. Referring to Table 3 above as an example, the normalized value for User 5 indicates that the "Sports" category has the highest percentage of category count. Accordingly, the top category for User 5 is determined to be the "Sports" category. In some embodiments, more than one top categories are determined for a user. Referring to Table 3 as another example, the normalized value for User 3 indicates that the "Fashion" and "Portraits" categories have the highest percentages of category counts. Accordingly, the top categories for User 3 are determined to be the "Fashion" and "Portraits" categories. It should be noted that, while the top categories for the active users are determined as early as in step 408 as discussed above, the top categories determined in step 408 do not represent the dominant categories of a user in some embodiments. As will be described in further detail below with reference to steps 410 through 414, dominant categories of a user are determined based on photography behavior of an average user and an average category count of each category. In some embodiments, step 408 is optional and method 220 proceeds from step 406 to step 410, without performing step 408.

In step 410, the normalized category histograms are clustered. That is, the active users are clustered based on each respective normalized distribution of category counts. In some embodiments, vectors are generated based on the normalized distribution of category count for each active user, thereby obtaining a vector indicating the category count distribution for each active user. In some embodiments, K-means clustering is utilized to cluster the normalized category counts of the active users. It is understood that any appropriate clustering method is utilized to perform the clustering in other embodiments, for example, density-based spatial clustering of applications with noise (DBSCAN), affinity propagation (AP), etc. In some embodiments, the number of clusters are empirically estimated.

Figure 5:
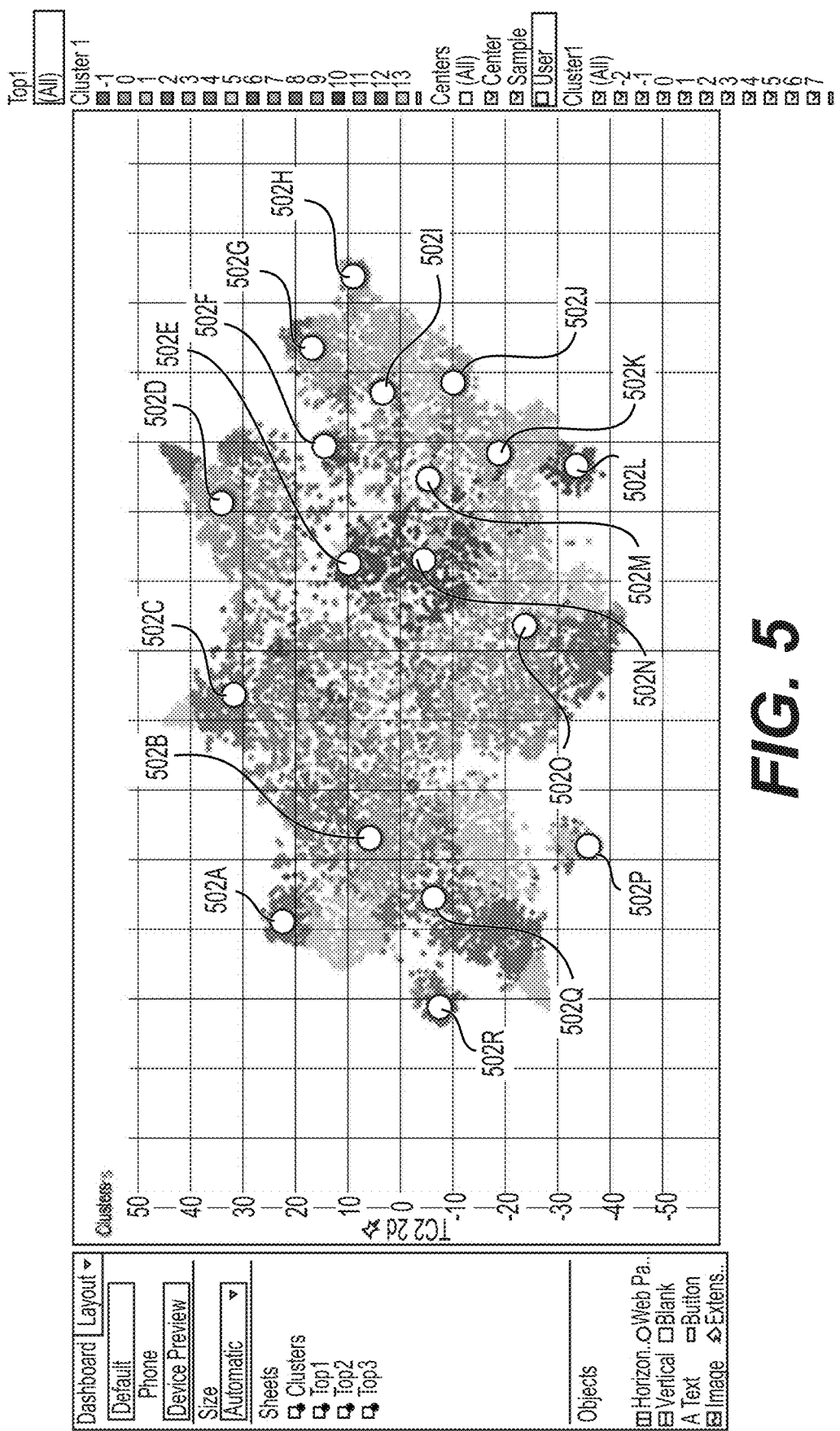
FIG. 5 provides an exemplary visualization of multiple clusters formed as a result of the clustering step, according to some embodiments.

FIG. 5 provides an exemplary visualization of multiple clusters formed as a result of the clustering step (i.e., step 410). As shown in FIG. 5, the various clusters are visualized in a T-distributed Stochastic Neighbor Embedding (TSNE) space according to some embodiments. It is understood that a TSNE space provides a visualization of high-dimensional data in a low-dimensional space of two or three dimensions. For example, each vector depicting the normalized distribution of category count for an active user is presented as a dot on a two dimensional grid as shown in FIG. 5. Each vector is considered high-dimensional due to the number of categories and category count distribution across the numerous categories that the vector represents for each active user. As shown in FIG. 5, each group of clustered dots is depicted in varying shades of gray in the TSNE space to distinguish the different clusters.

Figure 6:
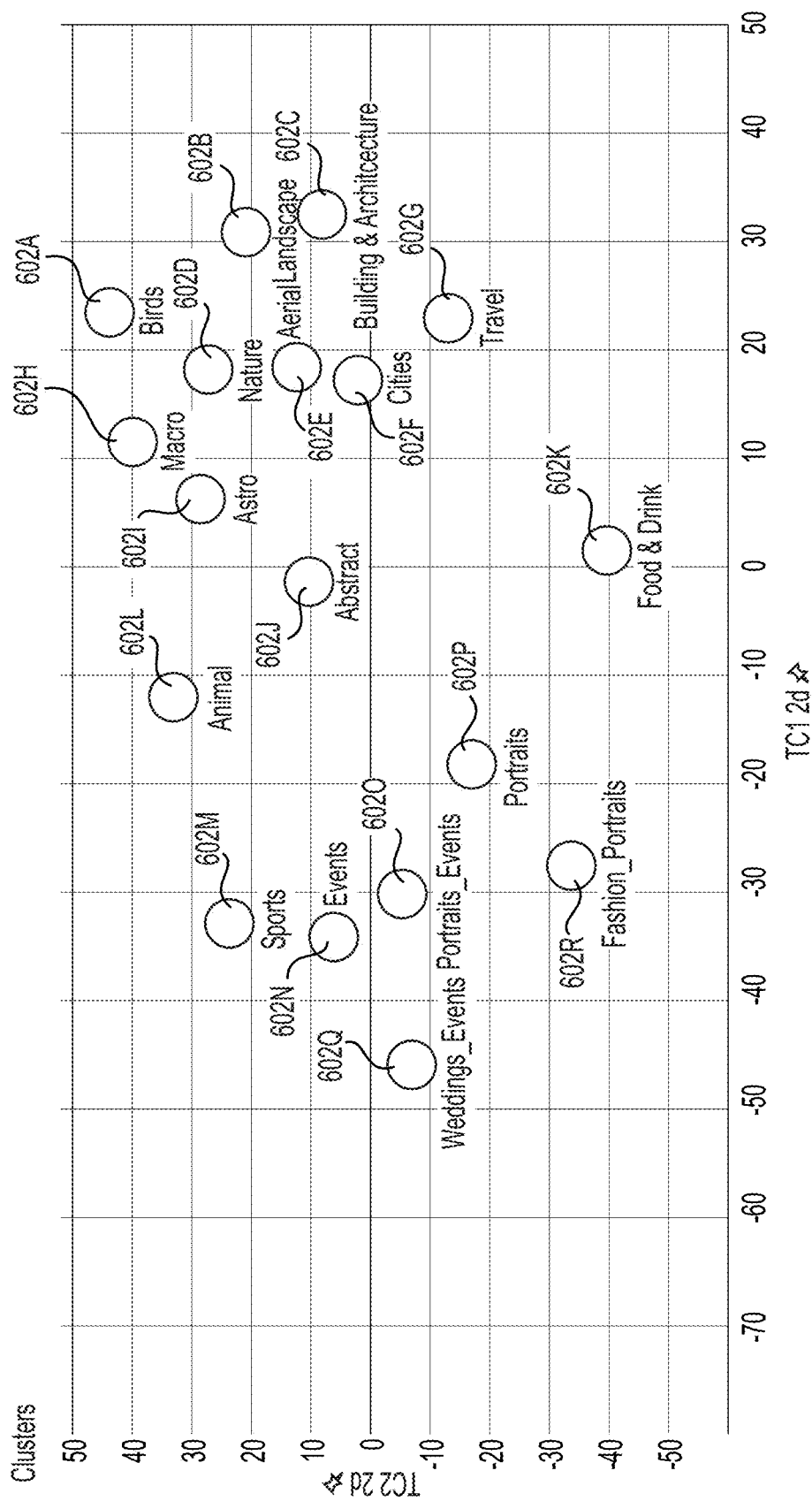
FIG. 6 provides an exemplary visualization of multiple cluster means according to some embodiments.

In step 412, the mean of each cluster is determined and one or more dominant categories are estimated for each cluster. A mean category count is determined based on the normalized distribution of category counts of each cluster according to some embodiments. The determined mean category counts (hereinafter referred to as "cluster means") are depicted as relatively larger dots 502A-502R in the TSNE space shown in FIG. 5. One or more dominant categories are then estimated for each cluster. In some embodiments, the one or more dominant categories for each clusters are estimated based on the dominant users in the clusters. For example, each cluster has a plurality of users where a relatively high proportion of the users have overlapping top categories (also referred to as dominant users). In such instances, the one or more dominant categories for each cluster are estimated at least based on the one or more top categories of the dominant users in the cluster. The estimated categories for the clusters are assigned to each respective cluster mean, as shown in FIG. 6. FIG. 6 provides an exemplary visualization of multiple cluster means formed as a result of the clustering step (i.e., step 410), with one or more estimated categories assigned to each of the cluster means. In some embodiments, a single dominant category is estimated for a cluster. For example, the estimated dominant category for a cluster associated with cluster mean 602A is the "Birds" category as shown in FIG. 6. In some embodiments, more than one dominant categories are estimates for a cluster. For example, the estimated dominant categories for a cluster associated with cluster mean 602O are the "Portraits" and "Events" categories. Accordingly, both "Portraits" and "Events" categories are assigned to cluster mean 602O as shown in FIG. 6.

Figure 7:
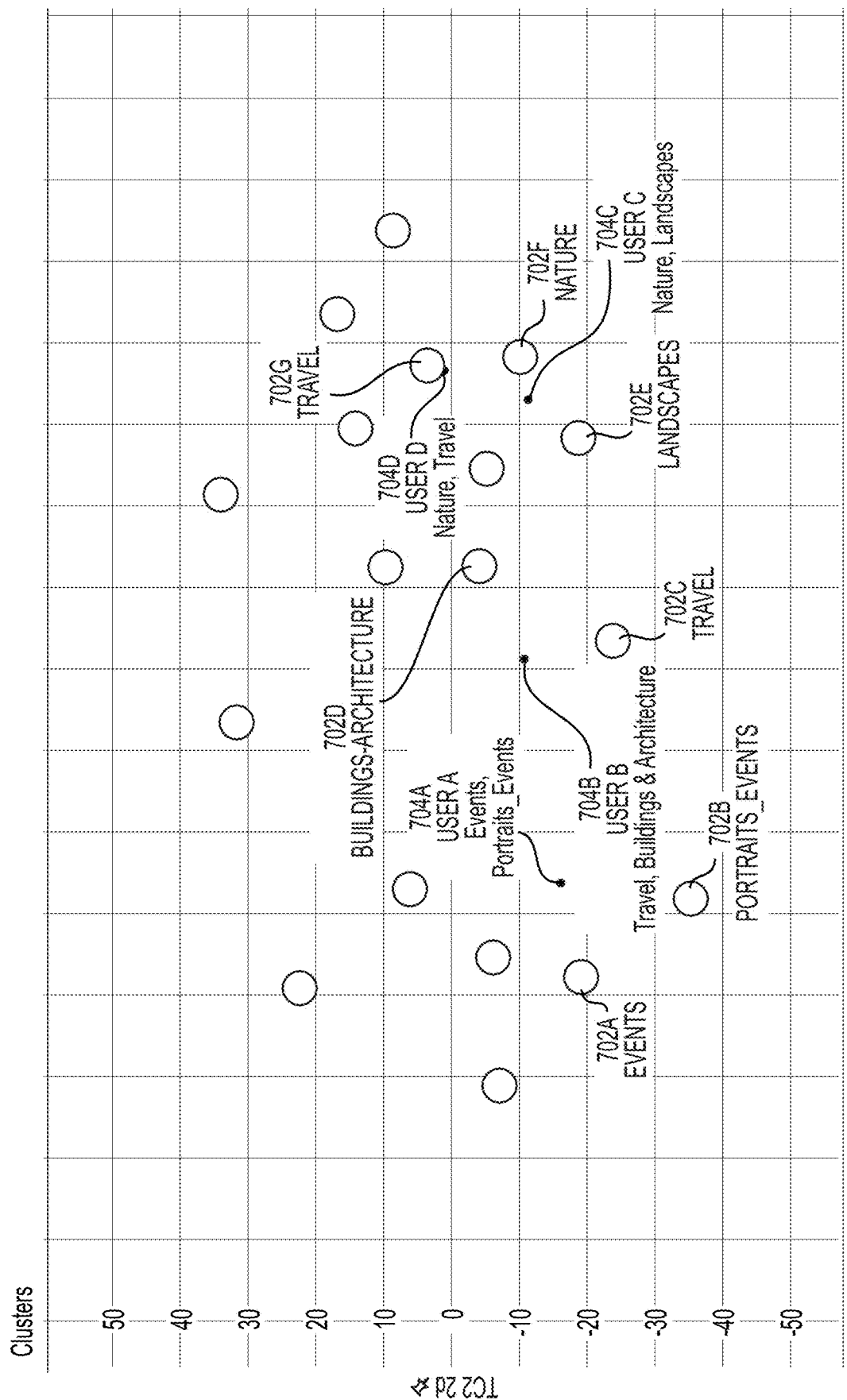
FIG. 7 provides an exemplary visualization of multiple cluster means and users, according to some embodiments.

In step 414, one or more dominant categories are assigned to each active user based on a nearest distance to a cluster mean. As shown in FIG. 7, the normalized category count(s) for one or more users, e.g., users 704A-704D, are depicted in the TSNE space. In some embodiments, the one or more users whose normalized category counts are depicted in the TSNE space are the active users determined above. In some embodiments, each active user is assigned to one or more clusters based on the distances between the user's normalized category count and the cluster means 702A-702G. For example, each active user is assigned to one or more clusters based on a nearest distance to one or more cluster means. In other words, each active user is assigned to one or more clusters that are closest to the user's normalized category count. The distance between each active user and the cluster means is determined based on any appropriate distance measuring method such as, for example, Euclidian distance or Mahalanobis distance.

In the example of FIG. 7, User A 704A (i.e., the normalized category count 704A associated with User A) is nearest to cluster mean 702A which has been assigned the "Events" category and cluster mean 702B which has been assigned the "Portraits_Events" categories. Accordingly, User A 704A is assigned to each of the two clusters, thereby assigning the associated categories to User A 704A, as shown in FIG. 7. As such, it is determined that User A 704A prefers images associated with "Events" and "Portraits" categories. That is, the dominant categories for User A 704A are "Events" and "Portraits" categories. Similarly, the dominant categories are determined for other users, e.g., User B 704B, User C 704C, and User D 704D. It should be noted that the number of dominant categories for each active user is less than or more than two in other embodiments. For example, one dominant category is assigned to a user based on one nearest cluster mean. As another example, three or more dominant categories are assigned to a user based on three or more nearest cluster means.

Figure 8:
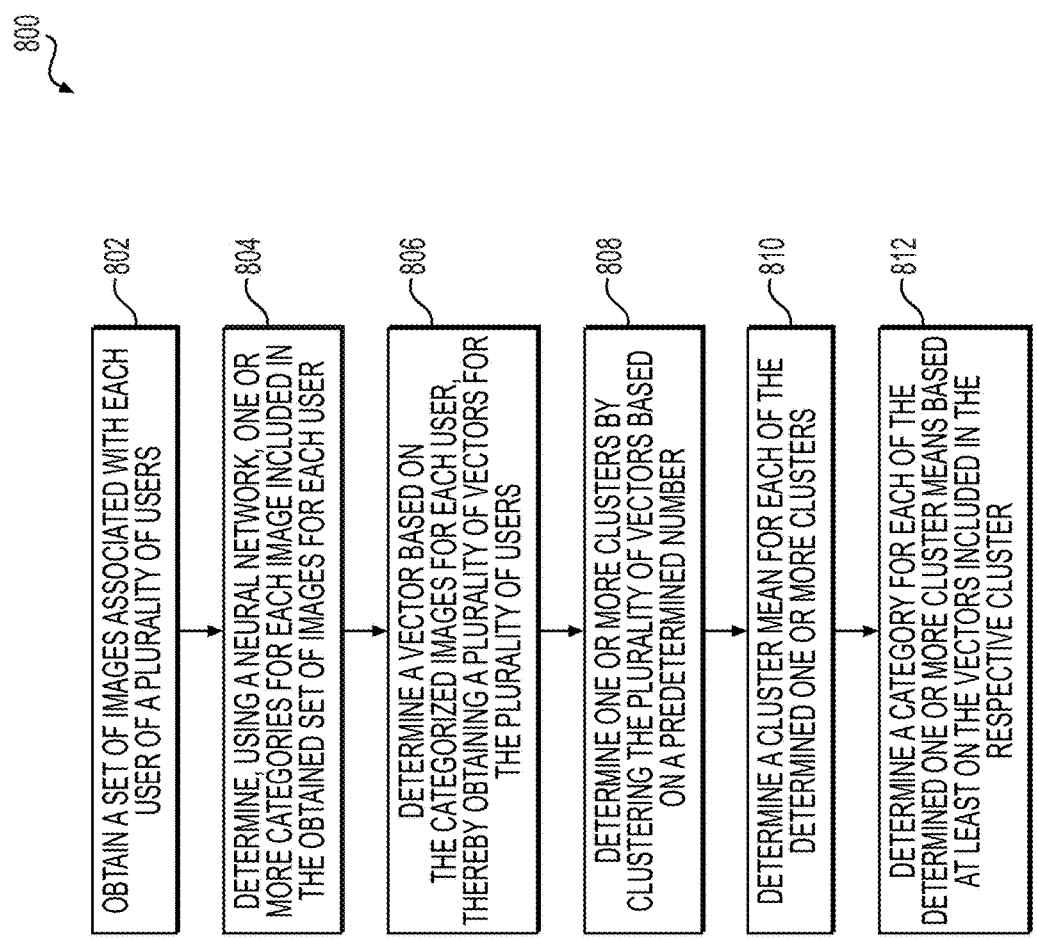
FIG. 8 depicts an exemplary method of determining categories for clusters, according to some embodiments.

FIG. 8 is a flowchart illustrating an exemplary method of determining categories for clusters, according to one aspect of the present disclosure. In some embodiments, method 800 begins with step 802 in which a set of images associated with each user of a plurality of users is obtained. In step 804, a neural network is utilized to determine one or more categories for each image included in the obtained set of images for each user. In step 806, a vector for each user is determined based on the categorized images associated with the user. Accordingly, a plurality of vectors for the plurality of users is obtained. Each vector indicates one or more categories associated with each user. In some embodiments, determining a vector based on the categorized images for each user includes determining a first mean number of categorized images under a first category for all of the plurality of users; determining a second mean number of categorized images under a second category for all of the plurality of users; and determining a vector for each user based at least on the determined first and second mean numbers. In some embodiments, determining a vector based on the categorized images for each user includes determining a first number of categorized images under a first category for a first user; determining a second number of categorized images under a second category for the first user; normalizing the first and second numbers; and determining a vector for the first user based at least on the normalized first and second numbers. In step 808, one or more clusters are determined by the clustering the plurality of vectors based on a predetermined number. For example, the number of desired clusters is determined based on a clustering method such as the K number of clusters for K-means clustering. In step 810, a cluster mean is determined for each of the determined one or more clusters. In step 812, a category is determined for each of the determined one or more cluster means based at least on the vectors included in the respective cluster.

In some embodiments, method 800 includes an additional step in which the neural network is trained to receive an input image and determine one or more categories associated with the input image, as explained above. In some embodiments, the determined one or more categories comprise hierarchical categories including at least one high level category and one or more subcategories to the high level category, as also explained above.

Figure 9:
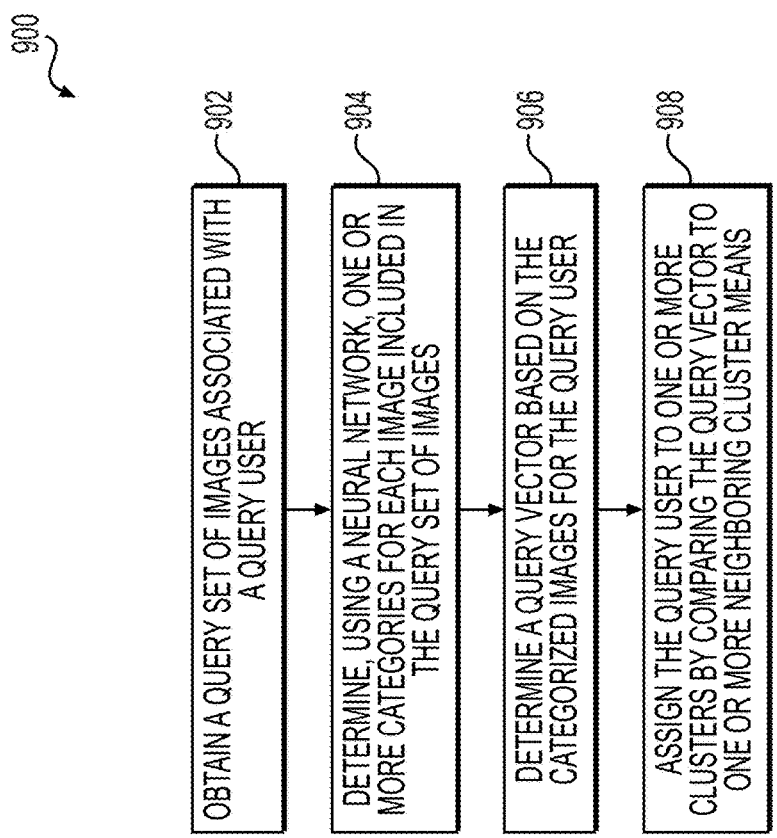
FIG. 9 depicts an exemplary method of assigning a user to one or more clusters, according to some embodiments.

FIG. 9 is a flowchart illustrating an exemplary method of assigning a user to one or more clusters, according to one aspect of the present disclosure. In some embodiments, method 900 is an extension of method 800. For example, step 902 of method 900 follows step 812 of method 800. Method 900 begins with step 902 in which a query set of images associated with a query user is obtained. In step 904, a neural network is used to determine one or more categories for each image included in the query set of images. In step 906, a query vector is determined based on the categorized images for the query user. In step 908, the query user is assigned to one or more clusters by comparing the query vector to one or more neighboring cluster means. In some embodiments, assigning the query user to one or more clusters by comparing the query vector to one or more neighboring cluster means includes determining a first distance between the query vector and a first cluster mean of a first neighboring cluster; determining a second distance between the query vector and a second cluster mean of a second neighboring cluster; and assigning the query user to the first neighboring cluster if the first distance is less than the second distance. In some embodiments, assigning the query user to one or more clusters by comparing the query vector to one or more neighboring cluster means includes determining a distance between the query vector and a cluster mean of a neighboring cluster; comparing the determined distance to a predetermined distance; and assigning the query user to the neighboring cluster if the determined distance is less than the predetermined distance.

Figure 10:
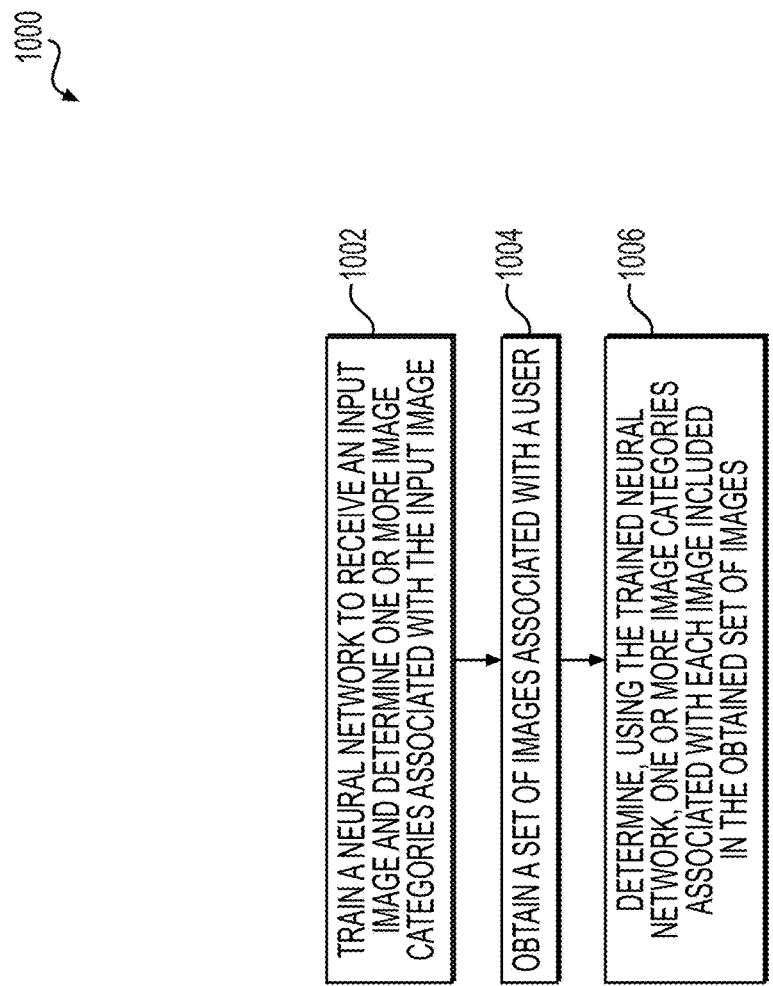
FIG. 10 depicts an exemplary method of determining an image editing user interface for a user based on dominant image categories, according to some embodiments.

FIG. 10 is a flowchart illustrating an exemplary method of determining an image editing user interface for a user based on dominant image categories, according to one aspect of the present disclosure. In some embodiments, method 1000 begins with step 1002 in which a network is trained to receive an input image and determine one or more image categories associated with the input image. In step 1004, a set of images associated with a user is obtained. In some embodiments, obtaining the set of images associated with the user includes receiving a plurality of images associated with the user and sampling the received plurality of images to obtain the set of images. In step 1006, one or more image categories associated with each image included in the obtained set of images are determined using the trained neural network. In some embodiments, the determined image categories for the obtained set of images comprise hierarchical categories including at least one high level category and one or more subcategories to the high level category.

In some embodiments, method 1000 includes an additional step in which, one or more dominant image categories associated with the user are determined based on the determined image categories for the obtained set of images. In some embodiments, an image editing user interface for the user is determined based on the determined one or more dominant image categories.

In some embodiments, determining the image editing user interface for the user based on the determined one or more dominant image categories includes generating one or more image editing tool recommendations for the user based on the determined one or more dominant image categories. In some embodiments, determining the image editing user interface for the user based on the determined one or more dominant image categories includes determining one or more image editing tutorials for the user based on the determined one or more dominant image categories.

In some embodiments, method 1000 includes a further step in which the set of images is displayed via the image editing user interface, wherein each image is displayed with the associated one or more determined image categories. In some embodiments, method 1000 includes a further step in which the user is notified of the determined one or more dominant image categories.

FIG. 11 provides a functional block diagram illustration of a general purpose computer hardware platform. FIG. 11 illustrates a network or host computer platform 1100, as typically used to implement a server, such as the one or more clients 102, servers 106, data stores 114, and the categorization system 108. It is believed that those skilled in the art are familiar with the structure, programming, and general operation of such computer equipment and, as a result, the drawings should be self-explanatory.

A platform for a server or the like 1100, for example, includes a data communication interface for packet data communication 1160. The platform also includes a central processing unit (CPU) 1120, in the form of one or more processors, for executing program instructions. The platform typically includes an internal communication bus 1110, program storage, and data storage for various data files to be processed and/or communicated by the platform such as ROM 1130 and RAM 1140, although the computer platform 1100 often receives programming and data via network communications 1170. In some embodiments, categorization system 108 is embodied in one or more combinations of hardware, software, and/or firmware. For example, the categorization system 108 is a part of a software application that is installed on any computing device consistent with or similar to the computer platform 1100 according to some embodiments. In some instances, the asset categorization engine 116, user categorization engine 118, categorized asset analysis engine 120, clustering engine 122, and/or category assignment engine 124 are part of one or more software applications installed and/or stored on RAM 1140. In some instances, the asset categorization engine 116, user categorization engine 118, categorized asset analysis engine 120, clustering engine 122, and/or category assignment engine 124 are part of one or more software applications installed and/or stored as firmware on ROM 1130.

The hardware elements, operating systems, and programming languages of such equipment are conventional in nature, and it is presumed that those skilled in the art are adequately familiar therewith. The computer platform 1100 also includes input and output ports 1150 to connect with input and output devices such as keyboards, mice, touchscreens, monitors, displays, etc. Of course, the various computer platform functions are implemented in a distributed fashion on a number of similar platforms, to distribute the processing load in some embodiments. Alternatively, the computer platforms are implemented by appropriate programming of one computer hardware platform.

Program aspects of the technology are thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which provide non-transitory storage at any time for the software programming. All or portions of the software are at times communicated through the Internet or various other communication networks in some embodiments. Such communications, for example, enable loading of the software from one computer or processor into another, for example, from a management server or host computer of the mobile communication network into the computer platform of a server and/or from a server to the mobile device. Thus, another type of media that bears the software elements includes optical, electrical and electromagnetic waves, such as used across physical interfaces between local devices, through wired and optical landline networks and over various air-links. The physical elements that carry such waves, such as wired or wireless links, optical links, or the like, also are considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents are resorted to, falling within the scope of the disclosure.

What is claimed is:

1. A computer-implemented method comprising:
    training a neural network to receive an input image and determine one or more image categories associated with the input image;
    obtaining a set of images;
    determining, using the trained neural network, one or more image categories associated with each image included in the obtained set of images;
    determining one or more dominant image categories based on the determined image categories for the obtained set of images;
    determining an image editing user interface based on the determined one or more dominant image categories; and
    outputting the image editing user interface for display.

2. The computer-implemented method of claim 1, wherein obtaining the set of images comprises:
    receiving a plurality of images associated with a user; and
    sampling the received plurality of images to obtain the set of images.

3. The computer-implemented method of claim 1, wherein the determined image categories for the obtained set of images comprise hierarchical categories including at least one high level category and one or more subcategories to the high level category.

4. The computer-implemented method of claim 1, wherein the determining the image editing user interface includes generating one or more image editing tool recommendations for the user based on the determined one or more dominant image categories.

5. The computer-implemented method of claim 1, wherein the determining the image editing user interface includes determining one or more image editing tutorials based on the determined one or more dominant image categories.

6. The computer-implemented method of claim 1, further comprising:
displaying the set of images via the image editing user interface, wherein each image is displayed with the associated one or more determined image categories.

7. A computer system comprising:
an asset categorization engine configured to perform operations including:
training a neural network to determine one or more image categories based on an input image;
obtaining a set of images; and
determining, using the trained neural network, image categories associated with each image included in the obtained set of images; and
a category assignment engine configured to perform operations including:
determining a dominant image category based on the determined image categories for the obtained set of images; and
configuring an image editing user interface based on the dominant image category.

8. The computer system of claim 7, wherein the obtaining the set of images comprises:
receiving a plurality of images; and
sampling the received plurality of images to obtain the set of images.

9. The computer system of claim 7, wherein the determined image categories for the obtained set of images comprise hierarchical categories including at least one high level category and one or more subcategories to the high level category.

10. The computer system of claim 7, wherein the configuring includes
generating an image editing tool recommendations based on the dominant image category.

11. The computer system of claim 7, wherein the configuring includes
determining an image editing tutorials based on the dominant image category.

12. A computer-implemented method comprising:
obtaining a set of images associated with each user of a plurality of users;
determining, using a neural network, one or more categories for each image included in the obtained set of images for each user;
determining a vector based on the one or more categories for the set of images for each user, thereby obtaining a plurality of vectors for the plurality of users, each vector indicates one or more categories associated with each user;
determining one or more clusters by clustering the plurality of vectors based on a predetermined number;
determining a cluster mean for each of the determined one or more clusters;
determining a category for each of the determined one or more cluster means based at least on the vectors included in the respective cluster;
obtaining a query set of images associated with a query user;
determining, using the neural network, one or more categories for each image included in the query set of images;
determining a query vector based on the categories for the images included in the query set of images for the query user; and
assigning the query user to one or more of the determined one or more clusters by comparing the query vector to one or more neighboring cluster means.

13. The computer-implemented method of claim 12, further comprising:
training the neural network to receive an input image and determine one or more categories associated with the input image.

14. The computer-implemented method of claim 12, wherein the determined one or more categories for each image comprise hierarchical categories including at least one high level category and one or more subcategories to the high level category.

15. The computer-implemented method of claim 12, wherein determining the vector based on the one or more categories for the set of images for each user comprises:
determining a first mean number of categorized images under a first category for all of the plurality of users;
determining a second mean number of categorized images under a second category for all of the plurality of users; and
determining a vector for each user based at least on the determined first and second mean numbers.

16. The computer-implemented method of claim 12, wherein the determining the vector based on the one or more categories for the set of images for each user comprises:
determining a first number of categorized images under a first category for a first user;
determining a second number of categorized images under a second category for the first user;
normalizing the first and second numbers; and
determining a vector for the first user based at least on the normalized first and second numbers.

17. The computer-implemented method of claim 12, wherein assigning the query user to the one or more of the determined one or more clusters by comparing the query vector to the one or more neighboring cluster means comprises:
determining a first distance between the query vector and a first cluster mean of a first neighboring cluster;
determining a second distance between the query vector and a second cluster mean of a second neighboring cluster; and
assigning the query user to the first neighboring cluster if the first distance is less than the second distance.

18. The computer-implemented method of claim 12, wherein assigning the query user to the one or more of the determined one or more clusters by comparing the query vector to the one or more neighboring cluster means comprises:
determining a distance between the query vector and a cluster mean of a neighboring cluster;
comparing the determined distance to a predetermined distance; and assigning the query user to the neighboring cluster if the determined distance is less than the predetermined distance.

19. The computer-implemented method of claim 12, further comprising determining an image editing user interface for the query user based on the one or more of the determined one or more clusters.

20. The computer-implemented method of claim 19, wherein the determining the image editing user interface includes generating one or more image editing tool recommendations or determining one or more image editing tutorials.

* * * * *

UNITED STATES PATENT AND TRADEMARK OFFICE
CERTIFICATE OF CORRECTION

PATENT NO. : 11,468,674 B2
APPLICATION NO. : 16/995869
DATED : October 11, 2022
INVENTOR(S) : Jayant Kumar et al.

Page 1 of 1

It is certified that error appears in the above-identified patent and that said Letters Patent is hereby corrected as shown below:

In the Claims

Column 17, Line 7, after "recommendations", delete "for the user".

Column 17, Line 47, after "editing tool", delete "recommendations", insert --recommendation--, therefor.

Column 17, Line 51, after "image editing", delete "tutorials", insert --tutorial--, therefor.

Signed and Sealed this
Third Day of January, 2023

*Katherine Kelly Vidal*

Katherine Kelly Vidal
*Director of the United States Patent and Trademark Office*